UNITED STATES PATENT OFFICE.

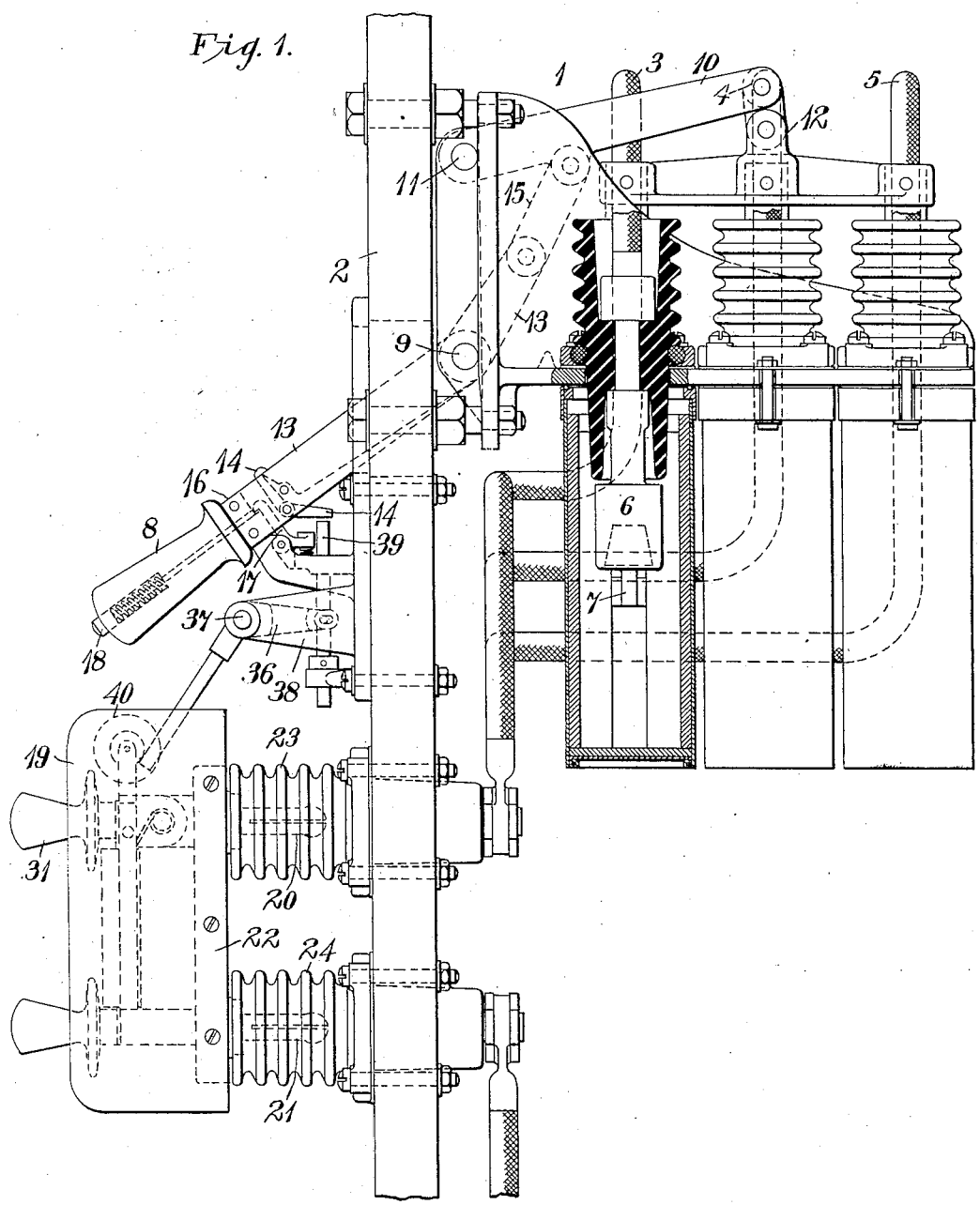

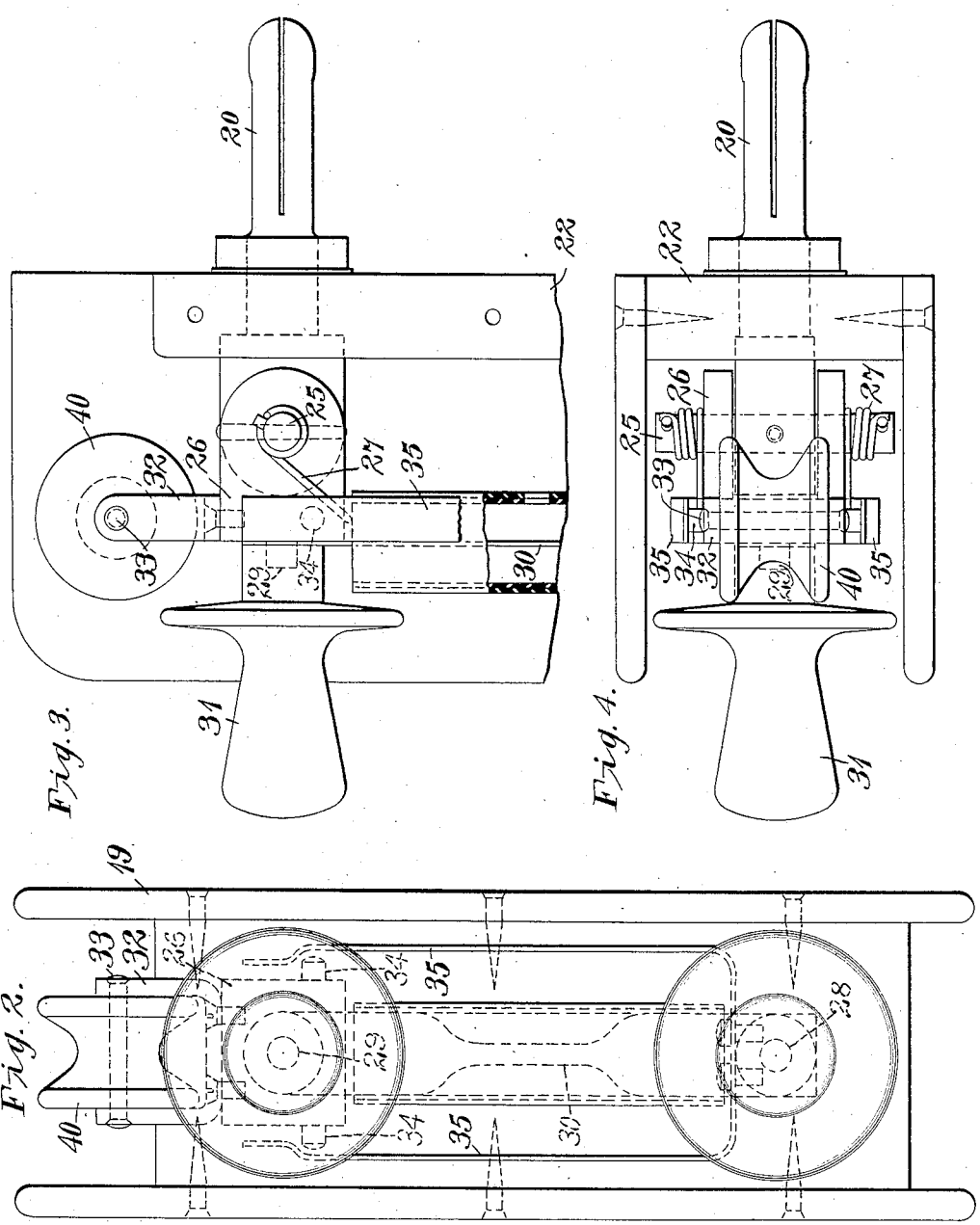

CARL B. AUEL, OF WILKINSBURG, PENNSYLVANIA, AND JOHN R. SPURRIER, OF MANCHESTER, ENGLAND, ASSIGNORS TO WESTINGHOUSE ELECTRIC & MANUFACTURING COMPANY, A CORPORATION OF PENNSYLVANIA.

CIRCUIT-INTERRUPTER.

974,109.     Specification of Letters Patent.     Patented Nov. 1, 1910.

Application filed September 4, 1906. Serial No. 333,131.

*To all whom it may concern:*

Be it known that we, CARL B. AUEL and JOHN R. SPURRIER, citizens of the United States, and residents, respectively of Wilkinsburg, in the county of Allegheny and State of Pennsylvania, and of Manchester, in the county of Lancaster, England, have invented a new and useful Improvement in Circuit-Interrupters, of which the following is a specification.

Our invention relates to interrupters for electric circuits, and it has for its object to provide a device of this character that shall be adapted for use with relatively high-voltage circuits and that shall be automatically actuated when the electric current traversing the circuit exceeds a predetermined amount for a considerable length of time.

The coöperating contact members of circuit interrupters which are adapted for high-voltage service are usually oil-immersed and when interrupters of this character have been arranged to be automatically actuated under overload conditions, the action of the tripping mechanism has usually been dependent upon the energization of an electromagnet which acted in opposition to a weight or spring. A tripping magnet of this kind is energized if the current traversing the circuit exceeds the predetermined amount, even for a very short time and, consequently, a circuit interrupter which is dependent upon such an arrangement is liable to be actuated unnecessarily since electrical apparatus, in general, may be subjected to a considerable overload for a short time without injury.

Relatively low-voltage circuits have often been protected by fuses which will permit considerable overloads to traverse the circuits for a short time, but these cannot be used with high voltages on account of the arcs which are formed when the circuits are interrupted.

According to our present invention, we provide, in an oil-immersed high-voltage circuit interrupter, a tripping device which is actuated by a fuse, so that the circuit will not be interrupted unless the current flowing therethrough exceeds a predetermined amount for a considerable time and so that the arcs may be extinguished.

Our invention is illustrated in the accompanying drawings, in which—

Figure 1 is a side elevation of a circuit interrupter constructed in accordance therewith, and Figs. 2, 3 and 4 are detail views of the tripping mechanism shown in Fig. 1.

Referring to the drawings, the circuit interrupter comprises a manually-operated oil switch 1 mounted upon a plate or slab 2 of insulating material and having a plurality of poles 3, 4 and 5, each of which comprises complementary stationary and movable contact members 6 and 7. The stationary and movable contact members 6 and 7 are shown as having substantially the same structural characteristics as those illustrated and described in Patent No. 758,621, granted to Westinghouse Electric & Manufacturing Company, as assignee of Harry P. Davis. The movable contact members 7 are adapted to be moved into and out of engagement with the stationary contact members by means of an operating handle lever 8 which is fulcrumed upon a stationary shaft 9, and they are connected together, in the usual manner, so that they may be operated simultaneously by a lever 10, which is fulcrumed upon a stationary shaft 11, at one end, and is connected to a rod 12, at the other end. A lever 13 is fulcrumed, at an intermediate point, upon the stationary shaft 9 and is detachably connected to the handle lever 8, at one end, by means of a latch 14. The said lever is connected, at its other end, to an intermediate point in the lever 10 by means of a link 15. The arrangement of the parts is such that, as the handle lever 8 moves through a relatively small angle, the movable contact members 7 are moved into and out of engagement with stationary contact members 6. The handle lever 8 is provided with a projection 16, which may be engaged by a latch 17, when the switch is in its closed position, in order to fasten it in that position. The latch 17 may be released by a push pin 18 which is located in the handle and projects beyond its outer end.

We deem it unnecessary further to describe the details and the operation of the switch since devices of this character are well known in the art, and our present invention is not restricted to any specific kind of interrupter.

In each circuit which is completed through the switch 1, we include a fuse mechanism 19 which is detachably mounted upon the insulating plate or slab 2. The fuse mechanism 19 comprises a pair of resilient contact plugs 20 and 21 which are mechanically connected and electrically separated by an insulating plate 22. The contact plugs 20 and 21 are adapted to engage a pair of socket contact members 23 and 24 which are surrounded by insulators and are attached to the slab or plate 2 at a suitable distance apart to receive the contact plugs. The inner ends of the contact sockets 23 and 24 project from the insulating slab 2 and are connected to the terminals of a circuit.

The outer extremity of the contact plug 21 in provided with a relatively short projection 28 of reduced size which is screw-threaded, and the outer extremity of the contact plug 20 is provided with a pin shaft 25 which is rigidly attached thereto and projects therefrom at each side, being disposed in a plane substantially parallel to the plane of the insulating slab 2. A clevis or U-shaped member 26 is rotatably mounted upon the pin shaft 25 and a spring 27 is so coiled about each end of the shaft and across the clevis 26 that this member tends to rotate from a position in a plane perpendicular to the slab 2 away from the plug 21. The clevis 26 is provided with a short screw-threaded projection 29 which corresponds to the projection 28 on the contact plug 20.

A strip 30 of fusible material having holes or slots near its extremities is stretched between the projections 28 and 29 and serves to hold clevis 26 in a plane substantially perpendicular to the insulating plate 22, in opposition to the spring 27. The entire fuse mechanism may be readily removed from the socket contacts 23 and 24 by means of handles 31 of insulating material which are screw-threaded upon the projections 28 and 29 and serve to keep the strip of fusible material in position. Attached to the clevis 26 and projecting outwardly therefrom in plane with the fuse, is another U-shaped member 32 to which a roller 40 of insulating material is attached by means of a shaft 33. The body portion of the clevis 26 is provided with projections 34 which extend laterally therefrom and which constitute contact members that move into engagement with a pair of resilient contact fingers 35 when the clevis rotates about the shaft 25. The stationary resilient contact fingers 35 are attached to the outer extremity of the contact plug 21 so that, in case the fusible material is ruptured for any reason, the circuit connections are immediately reëstablished between the contact plugs by means of the resilient fingers.

Below the operating handle lever 8, a bell crank 36 is rotatably mounted upon a stationary shaft 37 which is supported by a bracket 38. One arm of the bell crank is attached to a hammer rod 39 which is adapted to trip the latch 14 when the bell crank is rotated through a relatively small angle in one direction. The other arm of the bell crank projects close to the roller 40 so that movement of the roller about the shaft 25, as a center, effects suitable movement of the bell crank 36 to trip the latch 14.

The action of the interrupter in service, under overload conditions, is as follows: When the current traversing the circuit exceeds a predetermined amount and continues at such an excessive value for a considerable time, the strip of fusible material is softened and is ruptured by the spring 27, which immediately serves to rotate the clevis 26 until the projections 34 move into engagement with the resilient fingers 35, whereupon the circuit, which has been temporarily interrupted, is closed and the arc, formed when the fuse was interrupted, is immediately extinguished. The rotation of the clevis 26 further serves to produce a motion of the bell crank which trips the latch 14 and permits the main switch to open. In this way, the circuit is interrupted by the contact members, which are oil-immersed and which are not seriously injured by the electric arcs. In order to protect the surrounding apparatus from the effect of the arc which temporarily exists when the fuse is interrupted, and to assist in its extinguishment by the well known air blow-out principle, it may be found desirable to surround the fuse with a tube of some hard insulating material, such as fiber, having an opening near the center of its sides. In this way, by means of a comparatively simple mechanism, which may be readily adapted for use with various forms of circuit interrupters, we combine the advantages of the fuse with those of the automatic oil-immersed circuit interrupter.

We claim as our invention:

1. The combination with oil-immersed coöperating contact members, and a latch mechanism for holding the members in engagement, of a fuse in series with the contact members, and means for successively shunting the fuse and separating the contact members when the fuse is ruptured.

2. The combination with a circuit interrupter, a latch mechanism for holding the contact members in engagement with each other, and a tripping device for releasing the latch mechanism, of a fuse connected in series with the contact members, and means for successively shunting the fuse and separating the contact members when the fuse is ruptured.

3. The combination with coöperating stationary and movable contact members, and a latch mechanism for holding the members in engagement with each other, of a tripping device comprising a longitudinally movable hammer rod, an operating lever, a spring for actuating said lever, and a fuse electrically connected in series with the contact members and arranged to normally restrain the actuating spring and to release the same when it is ruptured.

4. The combination with coöperating stationary and movable contact members, and a latch mechanism for holding the contact members in engagement with each other, of a tripping device for releasing the latch, said device comprising a longitudinally movable hammer rod, an actuating spring, and a fuse electrically connected in series with the contact members and arranged to mechanically restrain the actuating spring.

5. A circuit interrupter comprising stationary socket terminals, an insulating block, a pair of contact plugs mounted in said block and engaging said socket terminals, coöperating stationary and movable main contact members, a latch mechanism for holding said main contact members in engagement with each other, a release mechanism, a fuse interposed between said contact plugs, and means for actuating the tripping mechanism when the fuse is ruptured.

6. The combination with oil-immersed coöperating contact members, and means for locking the members in engagement with each other, of a time-element circuit interrupting device in series with the oil-immersed contact members, means for establishing a conducting path around said interrupting device immediately after it is operated, and devices actuated by said means for tripping the movable contact member.

7. A circuit interrupter comprising a time element device, a mechanical breaker in series therewith, and means released by the time element device to establish a circuit independently thereof through the mechanical breaker and to trip said mechanical breaker.

8. A circuit interrupter comprising a fuse located in one fluid medium, a mechanical breaker located in a different fluid medium and connected in series with said fuse, and a shunting device for the fuse the operation of which is dependent upon a rupture of the fuse.

9. An automatic circuit interrupter comprising a fuse located in air, a mechanical breaker located in oil and connected in series with the fuse, and a shunting device for the fuse the operation of which is dependent upon a rupture of the fuse.

10. An automatic circuit interrupter for opening a circuit under predetermined conditions comprising a time-element device located in one fluid medium, a shunting device therefor, and a mechanical breaker located in a different fluid medium, and successively connected in series with the time-element device and the shunting device.

11. In a circuit interrupter, the combination with a mechanical circuit-breaker, a fuse in series circuit therewith, and means for successively shunting the fuse and operating the circuit-breaker to open the circuit when the fuse is ruptured.

12. An automatic circuit interrupter comprising separable oil-immersed contact terminals, means for normally holding said terminals in engagement, a time-element device connected in series with said terminals and located in air, means for successively establishing a shunt to said time-element device and effecting a separation of said terminals as soon as said time-element device operates.

In testimony whereof, I have hereunto subscribed my name this 31st day of August, 1906.

CARL B. AUEL.

Witnesses:
 HIRAM A. TAYLOR,
 R. J. DEARBORN.

In testimony whereof, I have hereunto subscribed my name this 17th day of August, 1906.

JOHN R. SPURRIER.

Witnesses:
 J. M. EDGE,
 JAS. STEWART BROADFOOT.